United States Patent
Schuler et al.

(10) Patent No.: US 7,248,751 B2
(45) Date of Patent: Jul. 24, 2007

(54) ALGORITHMIC TECHNIQUE FOR INCREASING THE SPATIAL ACUITY OF A FOCAL PLANE ARRAY ELECTRO-OPTIC IMAGING SYSTEM

(75) Inventors: Jonathon M Schuler, Fairfax, VA (US); Dean A Scribner, Arlington, VA (US); J Grant Howard, Laplata, MD (US)

(73) Assignee: United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/808,267

(22) Filed: Mar. 11, 2004

(65) Prior Publication Data

US 2005/0201637 A1    Sep. 15, 2005

(51) Int. Cl.
*G06K 9/32* (2006.01)

(52) U.S. Cl. ............ 382/284; 382/297; 382/298; 382/299

(58) Field of Classification Search ............ 382/284, 382/299, 294, 298
See application file for complete search history.

(56) References Cited

U.S. PATENT DOCUMENTS

| 5,975,703 | A | 11/1999 | Holman et al. |
|---|---|---|---|
| 6,375,327 | B2 | 4/2002 | Holman et al. |
| 6,434,280 | B1 * | 8/2002 | Peleg et al. ............ 382/299 |
| 6,445,415 | B1 * | 9/2002 | Olsson ............ 348/345 |
| 6,480,229 | B1 | 11/2002 | Driscoll et al. |
| 6,515,696 | B1 | 2/2003 | Driscoll et al. |

| 2004/0165781 | A1 * | 8/2004 | Sun ............ 382/236 |
|---|---|---|---|

FOREIGN PATENT DOCUMENTS

WO          02059692         8/2002

OTHER PUBLICATIONS

Rumo et al., "Superresolution in images using optical flow and irregular sampling", Summer 2003, LCAV—School of Computer and Communication Sciences.*
Irani et al., "Motion Analysis for Image Enhancement: Resolution, Occlusion, and Transparency", 1993, The Hebrew University of Jerusalem—Institute of Computer Science.*
Irani et al., "Super Resolution from Image Sequences", 1990, The Hebrew University of Jerusalem—Institute of Computer Science.*
Huang, T. S. and Tsai, R.Y., "Multiple frame image restoration and registration", Advances in Computer Vision and Image Processing, vol. 1, JAI Press, 1984.

(Continued)

*Primary Examiner*—Matthew C. Bella
*Assistant Examiner*—Patrick Edwards
(74) *Attorney, Agent, or Firm*—John J. Karasek; Sally A. Ferrett

(57) ABSTRACT

A system for enhancing images from an electro-optic imaging sensor and for reducing the necessary focal length of a sensor while preserving system acuity. This system uniquely reduces the necessary focal length and enhances images by collecting a video sequence, estimating motion associate with this sequence, assembling video frames into composite images, and applying image restoration to restore the composite image from pixel, lens blur, and alias distortion. The invention synthetically increases the pixel density of the focal plane array. Thus it reduces the necessary size of the projected blur circle or equivalently it reduces the minimum focal length requirements.

8 Claims, 10 Drawing Sheets

OTHER PUBLICATIONS

Tekalp, A. M., Digital Video Processing, pp. 81-86 & table of contents, 1995 Prentice Hall.

Richardson, W.H., "Baysian-Based Iterative Method of Image Restoration", J. Opt. Soc. Am., vol. 62, No. 1, p. 55-59 (1972).

Dixon, D.D. et al., "Pixon-based Deconvolution", Astronomy and Astrophysics Supplement Series, vol. 120, pp. 683-686 (1996).

Jain, A.K., Fundamentals of Digital Image Processing, Chapter 8 and table of contents, pp. 267-341, Prentice Hall 1989.

J. M. Schuler, J. G. Howard, P. R. Warren, and D. A. Scribner, "TARID-based adaptive nonuniformity correction", Proc. SPIE Int. Soc. Opt. Eng., vol. 4719, p. 240-246, 2002.

J. M. Schuler, J. G. Howard, P. R. Warren, and D. A. Scribner, TARID-based image super-resolution, Proc. SPIE Int. Soc. Opt. Eng. 4719, 247-254 (2002).

J. M. Schuler, J. G. Howard, P. R. Warren, and D. A. Scribner, "Scene-adaptive nonuniformity correction using TARID-composite image prediction", Proc. SPIE Int. Soc. Opt. Eng. 4671, 888-894 (2002).

J. M. Schuler, J. G. Howard, P.R. Warren, and D. A. Scribner, "Resolution enhancement through TARID processing", Proc. SPIE Int. Soc. Opt. Eng. 4671, 872-876, (2002).

J. M. Schuler, J. G. Howard, P. R. Warren, and D. A. Scribner, "Robust tie-point registration of disparate imaging sensors by matching optical flow" Proc. SPIE Int. Soc. Opt. Eng., vol. 4671, pp. 775-783 (2002).

J. M. Schuler, J. G. Howard, D.A. Scribner, P. R. Warren, R. B. Klein, M.P. Satyshur, and M. R. Kruer, "Resolution enhancement through a temporal accumulation of registered video", Proc. SPIE Int. Soc. Opt. Eng., vol. 4372, pp. 137-142 (2001).

J.M. Schuler, J. G. Howard, D.A. Scribner, P.R. Warren, R. B. Klein, Michael P. Satyshur, and M.R. Kruer, "Analytic registration of spatially and spectrally disparate co-located imaging sensors achieved by matching optical flow", Proc. SPIE Int. Soc. Opt. Eng., vol. 4381, pp. 265-274 (2001).

J.M. Schuler, J. G. Howard, D.A. Scribner, P.R. Warren, R. B. Klein, M. P. Satyshur, and M.R. Kruer, "Multiband E/O color fusion with consideration of noise and registration", Proc. SPIE Int. Soc. Opt. Eng. 4029, pp. 32-40 (2000).

D.A. Scribner, J.M. Schuler, P.R. Warren, J. G. Howard, and M. R. Kruer, "Image preprocessing for the infrared" Proc. SPIE Int. Soc. Opt. Eng., vol. 4028, pp. 222-233 (2000).

J. G. Howard, P. R. Warren, R. Klein, J.M. Schuler, M. P. Satyshur, D. A. Scribner, and M. R. Kruer, "Real-time color fusion of E/O sensors with PC-based COTS hardware", Proc. SPIE Int. Soc. Opt. Eng., vol. 4029, pp. 41-48 (2000).

J. M. Schuler, D. A. Scribner, and M. R. Kruer, "Alias reduction and resolution enhancement by a temporal accumulation of registered data from focal plane array sensors", Proc. SPIE Int. Soc. Opt. Eng., vol. 4041, pp. 94-102 (2000).

J. M. Schuler and D.A. Scribner, "Increasing spatial resolution through temporal super-sampling of digital video", Opt. Eng., vol. 38, Issue 5, pp. 801-805 (1999).

D.A. Scribner, J.M. Schuler, P.R. Warren, M.P. Satyshur, and M. R. Kruer, "Infrared color vision: separating objects from backgrounds" Proc. SPIE Int. Soc. Opt. Eng., vol. 3379, pp. 2-13 (1998).

R.R. Mayer, J. Waterman, J. Schuler, and D. Scribner, "Spectral optimization studies and schemes to enhance target detection and display for a three-band staring LWIR sensor" Proc. SPIE Int. Soc. Opt. Eng., vol. 5159, pp. 20-31 (2003).

R. G. Driggers, K. Krapels, S.Murrill, S.Young, M.Thielke, and J. Schuler, "Superresolution performance for undersampled imagers", Opt. Eng., vol. 44, pp. 014002-1-14002-9 (2005).

K.A. Krapels, R.G. Driggers, S. Murrill, J. M. Schuler, M. Thielke, and S. S. Young, "Superresolution performance for undersampled imagers", Proc. SPIE Int. Soc. Opt. Eng., vol. 5407, pp. 139-149 (2004).

Kondi, L. P., Scribner D.A. and Schuler, J. M., "Comparison of digital image resolution enhancement techniques", Proc. SPIE Int. Soc. Opt. Eng., vol. 4719, pp. 220-229 (2002).

Jain, D. "Superresolution using Papoulis-Gerchberg Algorithm", [online], [retrieved on Dec. 15, 2005], retrieved from the internet < URL: http://www.stanford.edu/class/ee392j/student_projects_2004.html>.

Schuler, J.M., Scribner, D.A., "Dynamic Sampling, Resolution Enhancement, and Super Resolution", in Analysis of Sampled Image Systems, Tutorial Texts in Optical Engineering; vol. TT39; editors: Vollmerhausen, R.H., Driggers, R.G.; series editor:Donald O'Shea; SPIE Press, pp. 125-138, (2000).

Schuler, J. et al., "Super Resolution Imagery From Multi-frame Sequences with Random Motion", Proceedings IRIS Passive Sensors Conference, vol. 1, 1998, pp. 63-77.

Schuler, J. et al., "Super Sampling of Digital Video", Proceedings IRIS Passive Sensors Conference, vol. 1, 1999, pp. 295-300.

\* cited by examiner

```
function [shift] = correlation2D(ref,tgt);
ref = double(ref);tgt = double(tgt);sze = size(ref);
corr2D = fftshift(ifft2(fft2(ref).*conj(fft2(tgt))));
[Y,I] = max(corr2D(:));
[yy,xx] = ind2sub(sze,I);
shift = [yy xx] - sze/2 - [1 1];
shift = -shift;
```

*FIG. 5*

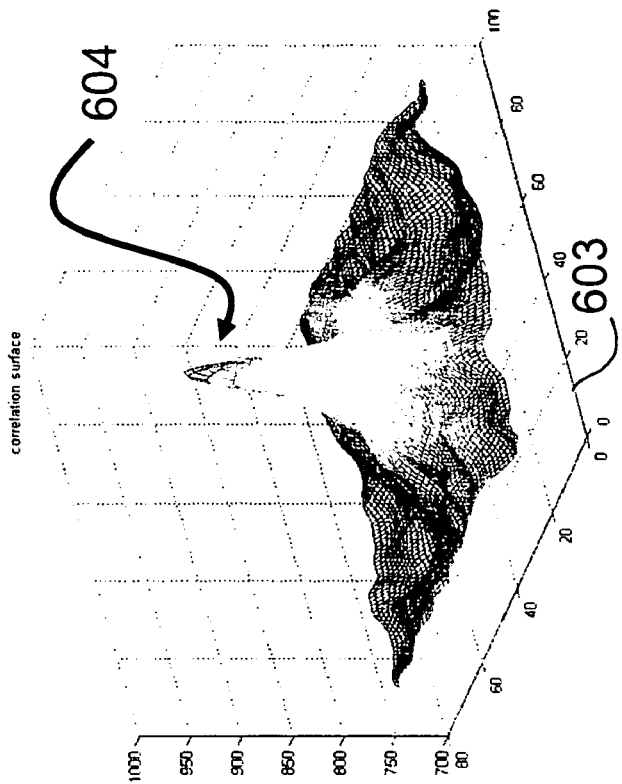
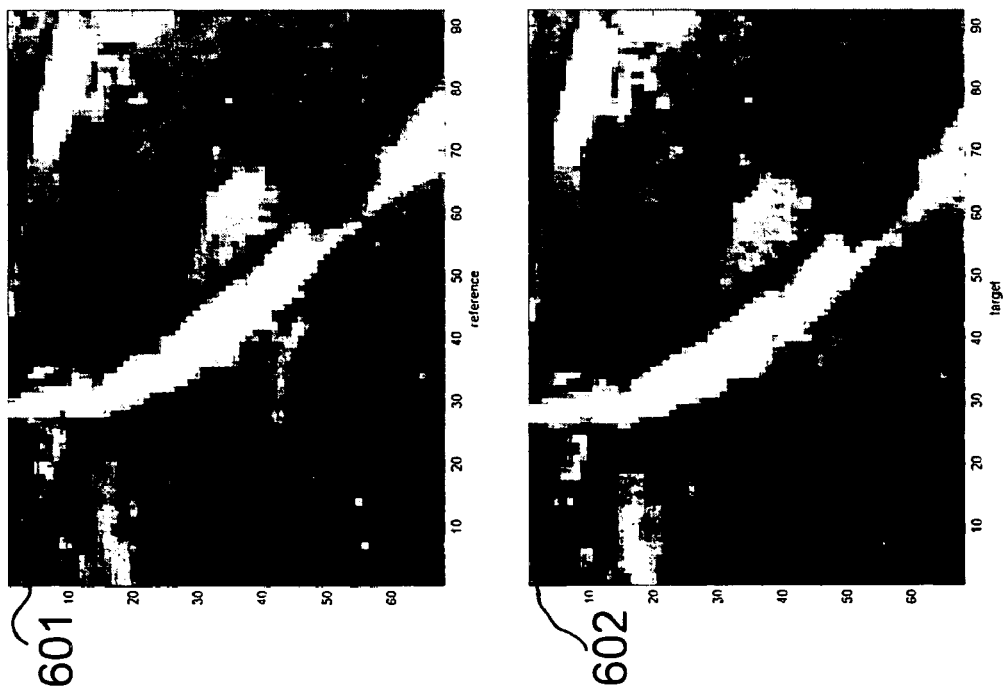
FIG. 6

```
function [shift] = grad_est(ref,tgt);
ref = double(ref);
tgt = double(tgt);
S000 = (ref(1:end-1,1:end-1));
S100 = (ref(2:end-0,1:end-1));
S010 = (ref(1:end-1,2:end-0));
S110 = (ref(2:end-0,2:end-0));
S001 = (tgt(1:end-1,1:end-1));
S101 = (tgt(2:end-0,1:end-1));
S011 = (tgt(1:end-1,2:end-0));
S111 = (tgt(2:end-0,2:end-0));
%
dSdx1 = (S100-S000+S110-S010+S101-S001+S111-S011)/4;
dSdx2 = (S010-S000+S110-S100+S011-S001+S111-S101)/4;
dSdx3 = (S001-S000+S101-S100+S011-S010+S111-S110)/4;
%
aa = dSdx1.^2;
a = sum(aa(:));
bb = dSdx2.^2;
b = sum(bb(:));
ab = dSdx1.*dSdx2;
d = sum(ab(:));
A = [a d; d b];
%
ac = dSdx1.*dSdx3;
bc = dSdx2.*dSdx3;
B = -[sum(ac(:)) sum(bc(:))]';
%
shift = A \ B;
shift = shift';
```

PRIOR ART
FIG. 7

| 801 | | | | |
|---|---|---|---|---|
| (1,m) | (2,m) | (3,m) | ... | (n,m) |
| ... | ... | ... | ... | ... |
| (1,3) | (2,3) | (3,3) | ... | (n,3) |
| (1,2) | (2,2) | (3,2) | ... | (n,2) |
| (1,1) | (2,1) | (3,2) | ... | (n,1) |

*FIG. 8*

ALGORITHMIC TECHNIQUE FOR INCREASING THE SPATIAL ACUITY OF A FOCAL PLANE ARRAY ELECTRO-OPTIC IMAGING SYSTEM

BACKGROUND OF THE INVENTION

1. Field of the Invention

This invention deals generally with an algorithm for increasing the spatial acuity of Focal Plane Array based Electro-Optic imaging systems by accumulating multiple frames of imagery into a single composite image and thus reducing the effective focal length of a viewing lens.

2. Description of the Related Prior Art

Single frame digital image restoration is a widely implemented mathematical technique that can compensate for known or estimated distortions endemic to a given digital image, improving the perceptual acuity and operational resolution of the constituent digital imaging sensor. (See Chapter 8 of *Fundamentals of Digital Image Processing*, A. K. Jain, Prentice Hall 1989)

The performance of such single-frame restoration techniques can be bounded by two limitations:

1) Insufficient spatial sampling of the projected optical image when measured by a single-frame capture of the projected optical image by a focal plane array. Depending on the F-number of the lens and the physical spacing (pixel pitch) of detectors, this situation may result in spatial alias distortion that is unrecoverable in a general sense.
2) Noise of the constituent pixel detectors in a focal plane array, and the associated read-out electronic microcircuits, which will limit the performance of any subsequent restoration filter.

When imaging an object of interest, a sensor may often stare at that object for sufficient time to create a video sequence of images that dwell, with the possibility to drift, over the particular object. For many applications, only a single frame is recorded and processed, discarding the statistically innovative information that may be contained in additional, but unexamined images captured by the focal plane array.

Straightforward implementation of resolution enhancement through multiple frames of imagery have been implemented by controlled micro-dither scanning of a sensor (W. F. O'Neal "Experimental Performance of a Dither-Scanned InSb Array" Proceedings on the 1993 Meeting of the IRIS Specialty Group on Passive Sensors), where a stationary scene is imaged by a sensor subject to a well controlled pattern of orientation displacements, such as an integer fraction of a pixel. Image recovery is then implemented by appropriately interlacing the constituent images into a composite image with an integer-multiple increase in sampling density. Such techniques are very effective in suppressing alias distortions of any single frame, but may come at the cost of stabilization requirements that limit their implementation in practical, man-portable sensor systems.

Without any deliberate dithering, such video sequences of images may still be subject to unknown displacements, which can be exploited to provide the same benefits as controlled dither. There has been a history of research in algorithms to implement a multi-frame image restoration on such data sets (T. S. Huang., "Multiple frame image restoration and registration," in Advances in Computer Vision and Image Processing, vol. 1, JAI Press, 1984.). The preponderance of these algorithms follows a common, non-linear approach to this problem:

1) Pre-suppose the existence of a high-resolution image, perhaps sampled at some integer multiple of the number of pixels of the constituent images. Seed this high resolution image with some initial guess, such as the interpolation of any single frame to the higher spatial sampling rate.
2) Derive some guess of the motion of the video sequence relative to the high resolution image. Displace and down-sample the high resolution image so as to create a synthetic video sequence consistent with the observed video sequence.
3) Determine some form of error between the synthetic and actual video sequence.
4) Adjust the estimates of both the high-resolution image and the scene motion so as to reduce the error between synthetic and actual video sequences.
5) Repeat steps 3 & 4 until a convergence in error has been reached.

This approach to multi-frame image restoration is plagued by three limitations

1) Iterative algorithms often exhibit long convergence times and are computationally intense.
2) Numerical techniques for adjusting the estimates of step 4 often depend on specifying an underlying probability distribution model. Such Maximum Likelihood or Maximum A-Postori techniques prove to be numerically unstable if the underlying data deviates from such idealized statistical models.
3) Many such algorithms are constrained to cases of simple motion models, such as uniform displacements between frames of video, which may not fully represent the true motion of the sequence.
4) Final restoration of the high resolution image additionally depends on an empirical smoothing kernel with little or no analytic derivation.

SUMMARY OF THE INVENTION

This invention relates to particular types of imaging systems, and more specifically, to a method that improves the spatial resolution of such imaging systems. This is achieved by assimilating a video sequence of images that may drift, yet dwell, over an object of interest into a single composite image with higher spatial resolution than any individual frame from the video sequence.

This technique applies to a particular class of non-coherent electro-optical imaging systems that consist of a lens projecting incoming light onto a focal plane. Positioned at the focal plane is an array of electronic photo-conversion detectors, whose relative spatial positions at the focal plane are mechanically constrained to be fixed, such as through lithography techniques common to the manufacturing processes of focal plane array detectors.

It is noted this invention cannot increase the physically achievable resolution of an imaging system, which is fundamentally bounded by the diffraction limit of a lens with finite aperture at a given wavelength of non-coherent light. Rather, this invention recovers for resolution that is additionally lost to distortions of noise, aliasing, and pixel blur endemic to any focal plane array detector. This process is implemented on a computational platform that acquires frames of digital video from an imaging system that drifts, yet dwells on an object of interest. This process assimilates this video sequence into a single image with improved qualities over that of any individual frame from the original sequence of video. A restoration process can then be applied to the improved image, resulting in operational image acuity.

BRIEF DESCRIPTION OF THE DRAWINGS

FIG. 5 illustrates, in MATLAB script, the algorithm that implements an estimate of nearest pixel image displacement, by image correlation.

FIG. 6 illustrates the correlation surface corresponding to two images of the same scene subject to sensor motion.

FIG. 7 illustrates, in MATLAB script, an algorithm that implements sub-pixel image displacement by numerical solution to the Brightness Constancy Constraint (BCC) equation.

FIG. 8 illustrates the coordinate topology of focal plane array (FPA) sensors in which every pixel can be addressed by an ordered pair of whole-integers.

DETAILED DESCRIPTION OF THE INVENTION

This invention relates to particular types of imaging systems, and more specifically, to a method that improves the spatial resolution of such imaging systems. This is achieved by assimilating a video sequence of images that may drift, yet dwell, over an object of interest into a single composite image with higher spatial resolution than any individual frame from the video sequence.

This technique applies to a particular class of non-coherent electro-optical imaging systems that consist of a lens projecting incoming light onto a focal plane. Positioned at the focal plane is an array of electronic photo-conversion detectors, whose relative spatial positions at the focal plane are mechanically constrained to be fixed, such as through lithography techniques common to the manufacturing processes of focal plane array detectors.

It is noted this invention cannot increase the physically achievable resolution of an imaging system, which is fundamentally bounded by the diffraction limit of a lens with finite aperture at a given wavelength of non-coherent light. Rather, this invention recovers for resolution that is additionally lost to distortions of noise, aliasing, and pixel blur endemic to any focal plane array detector.

In conventional optical sensor design, the lens aperture size determines the diffraction limited resolution, in angle, of an optic at a specific wavelength. The lens projects this resolution limit as a blur-circle, or point-spread function, at the focal plane of the sensor. The actual size of the point spread function at the focal plane is geometrically related, and directly proportional to the focal length of the lens. In order for a focal plane array, with finite sized pixels, to sufficiently sample the projected optical image without alias distortion, the projected point spread function must be sufficiently large to span at least two to three pixels. This loose constraint places a bound on the minimum necessary focal length of a lens to eliminate alias distortion in the imagery captured by a focal plane array. The described invention synthetically increases the pixel density of the focal plane array. Thus, it reduces the necessary size of the projected blur circle, or equivalently, it reduces the minimum focal length required to eliminate alias distortion. The described invention permits optical sensors with a fixed size aperture to deploy lenses with shorter focal length that are more compact, weight less, and offer wider field of views, while maintaining system acuity.

Figure 1:
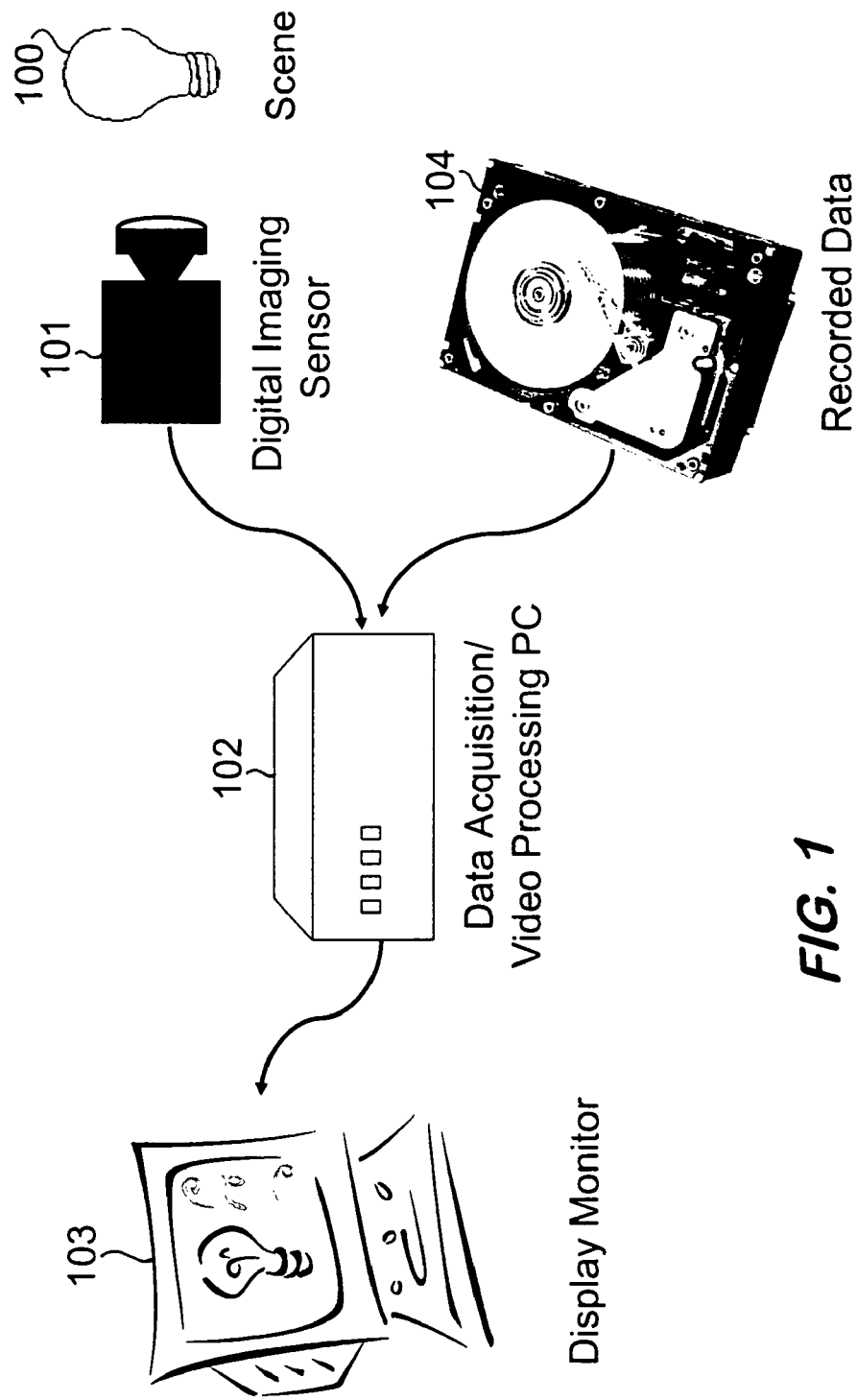
FIG. 1 illustrates a preferred embodiment of the invention in a computer processing system.

This preferred embodiment of this process is on a digital imaging system illustrated in FIG. 1. This system consists of a digital imaging sensor or camera, 101, consisting of a lens that focuses light, 100, onto a focal plane array of photodetectors that produces an electronic representation of the projected optical image of the lens. The data from this camera is then captured by some form of a computing platform, 102, such as a personal computer, laptop, handheld digital assistant, or any processing devices embedded within the camera, 101. Such a computing platform may also store captured image sequences for long durations on non-volatile media, 104. This computing platform is also capable of implementing the described process, rendering an image that is presented to the operator through some display device, 103.

Figure 2:
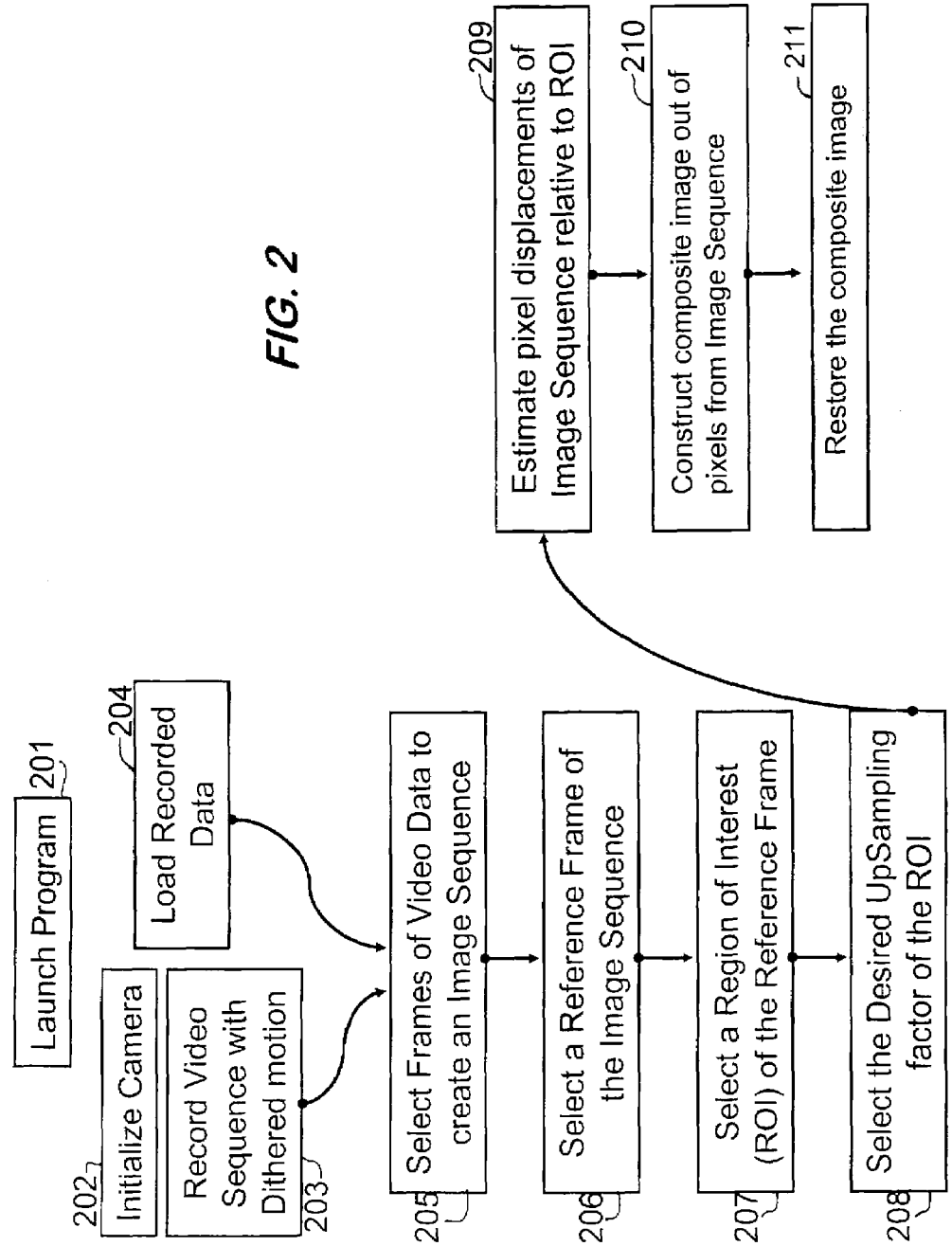
FIG. 2 illustrates a flow chart outlining the operation sequence of the invention.

The process of increasing the spatial acuity of Focal Plane Array based Electro-Optic imaging systems by accumulating multiple frames of imagery into a single composite image is illustrated in the process flow chart of FIG. 2.

The initial pre-processing steps will include the following:

1) Launching the software on the processing platform, 201. This may be done automatically with activation of the camera sensor, 202.
2) Collection of a video sequence with suitable motion displacement between frames, 203, or loading in a previously recorded suitable sequence from non-volatile digital data storage, 204.
3) From the acquired or loaded video sequence, select a subset of video frame which will be integrated into a final composite image, 205.
4) From the selected subset of video frames, select one particular frame which will serve as the template frame for subsequent restoration, 206.
5) From the template frame, select a particular spatial Region of Interest (ROI) that will be restored, 207.
6) Additionally, select a factor by which the spatial sampling of the digital image will be restored, 208.

Given such a configuration, multi-frame image restoration can be achieved in three further stages of processing illustrated in the process flow chart of FIG. 2.

1) Motion Estimation of a video sequence, 209.
2) Assembly of video frames into a single composite image based on estimated positions of individual pixels, 210.
3) Restoration of the composite image, 211

These three stages of processing are further elaborated as follows:

Step 1: Motion Estimation of a Video Sequence.

The motion of pixels in a video sequence can be characterized by the optical flow, defined as a mapping that relates the spatial coordinates of all pixels of a video sequence. Mathematically, the optical flow estimation problem is ill posed (referred as the "aperture problem"), and requires additional regularization constraints to generate a solution for this mapping between the spatial coordinates of pixels. Such regularization introduces a bias-variance trade in the motion estimation, between bias against sensitivity to spatially localized motion versus an increase in overall statistical variance of the motion estimator.

Figure 3:
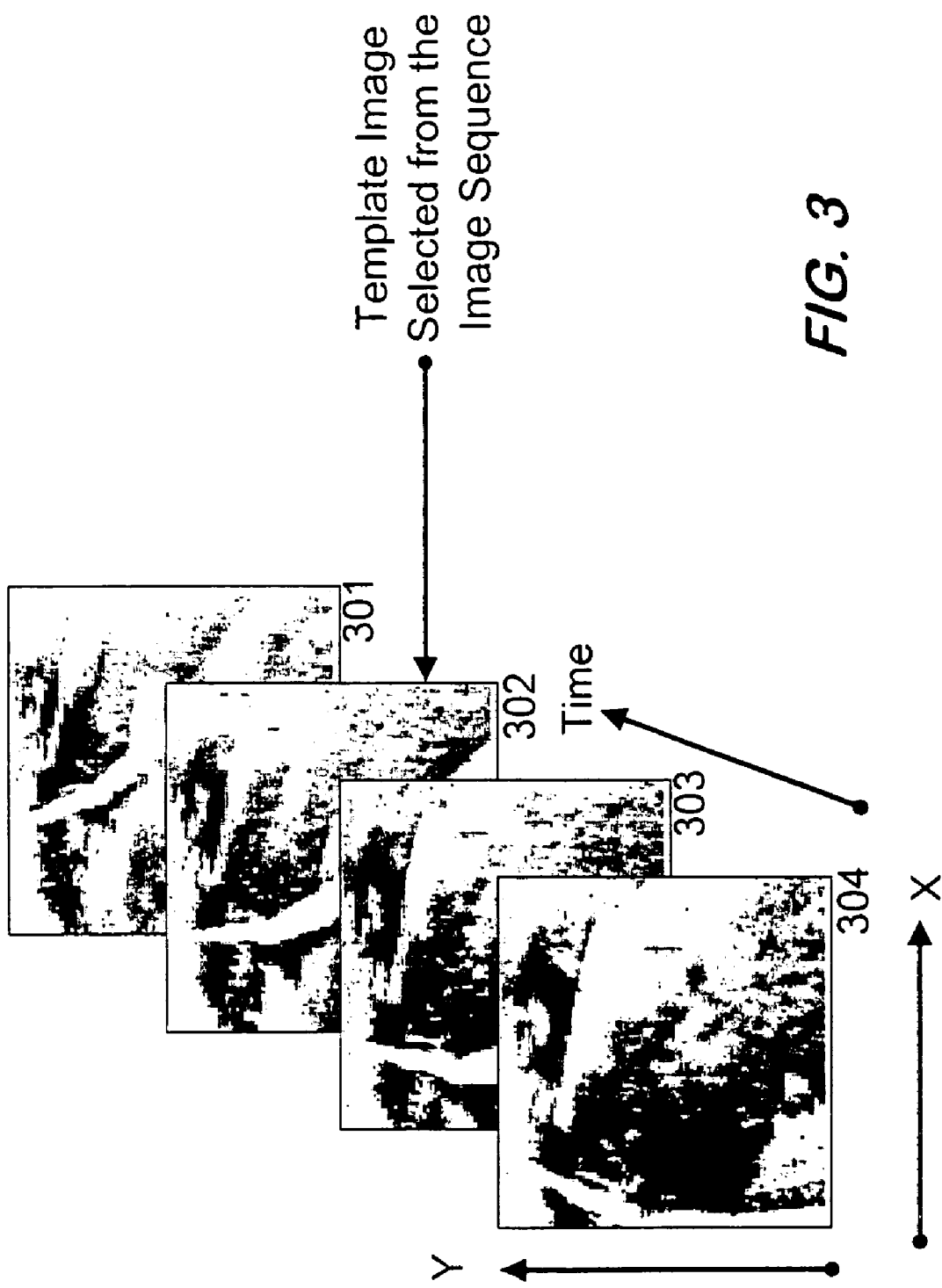
FIG. 3 illustrates a sequence of video imagery, along with corresponding coordinate directions.
Figure 4:
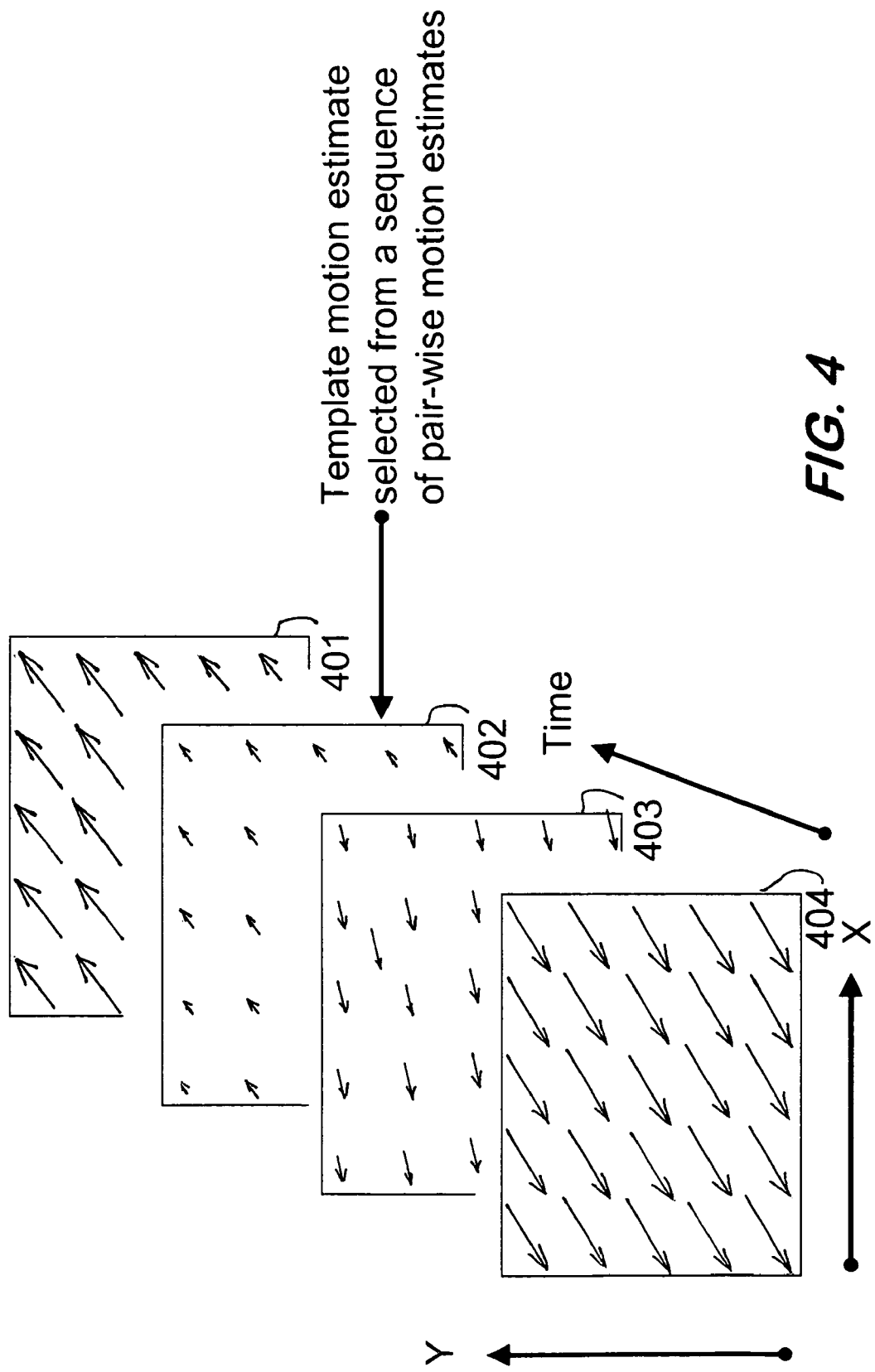
FIG. 4 illustrates a sequence of vector field plots, corresponding to the displacement estimated for every pixel of the video sequence illustrated in FIG. 3.

In this embodiment, a single image, 302, from the sequence, 301-304, is taken to serve as a template, as shown in FIG. 3. The motion of all other frames of video is estimated relative to this template image, as shown in FIG. 4. The motion of any particular frame can be described by a corresponding tensor field, 401-404, where every 2 dimensional pixel coordinate has associated a 2 dimensional vector corresponding to the pixel displacement relative to the corresponding pixel coordinate of the template frame. Because there is no motion of the template image with respect to itself, its corresponding motion field, 402, will be trivial arrays of zeros. In the current embodiment, the motion is assumed to be a uniform displacement. This uniform displacement is estimated by a two-stage procedure:

1) Estimate nearest-pixel displacement by image correlation. This is illustrated in by the MATLAB code of FIG. 5, as well as the correlation surface for two sequential frames of digital video, 601-602, illustrated in FIG. 6, where the location of the peak, 604, of this correlation surface, 603, corresponds to the displacement between the two images.
2) Given this estimate of nearest pixel displacement, re-crop each image accordingly so that the cropped images have the same size and are pixel aligned. Then, estimate the sub-pixel displacement between the cropped images by a least-squares solution to a brightness-constancy-constraint (BCC) model of the video sequence, which is illustrated in the MATLAB code of FIG. 7. Note that a brightness-constancy-constraint algorithm is described in Digital Video Processing, A. M. Tekalp, 1995 Prentice Hall, pp 81-86.

Figure 8:
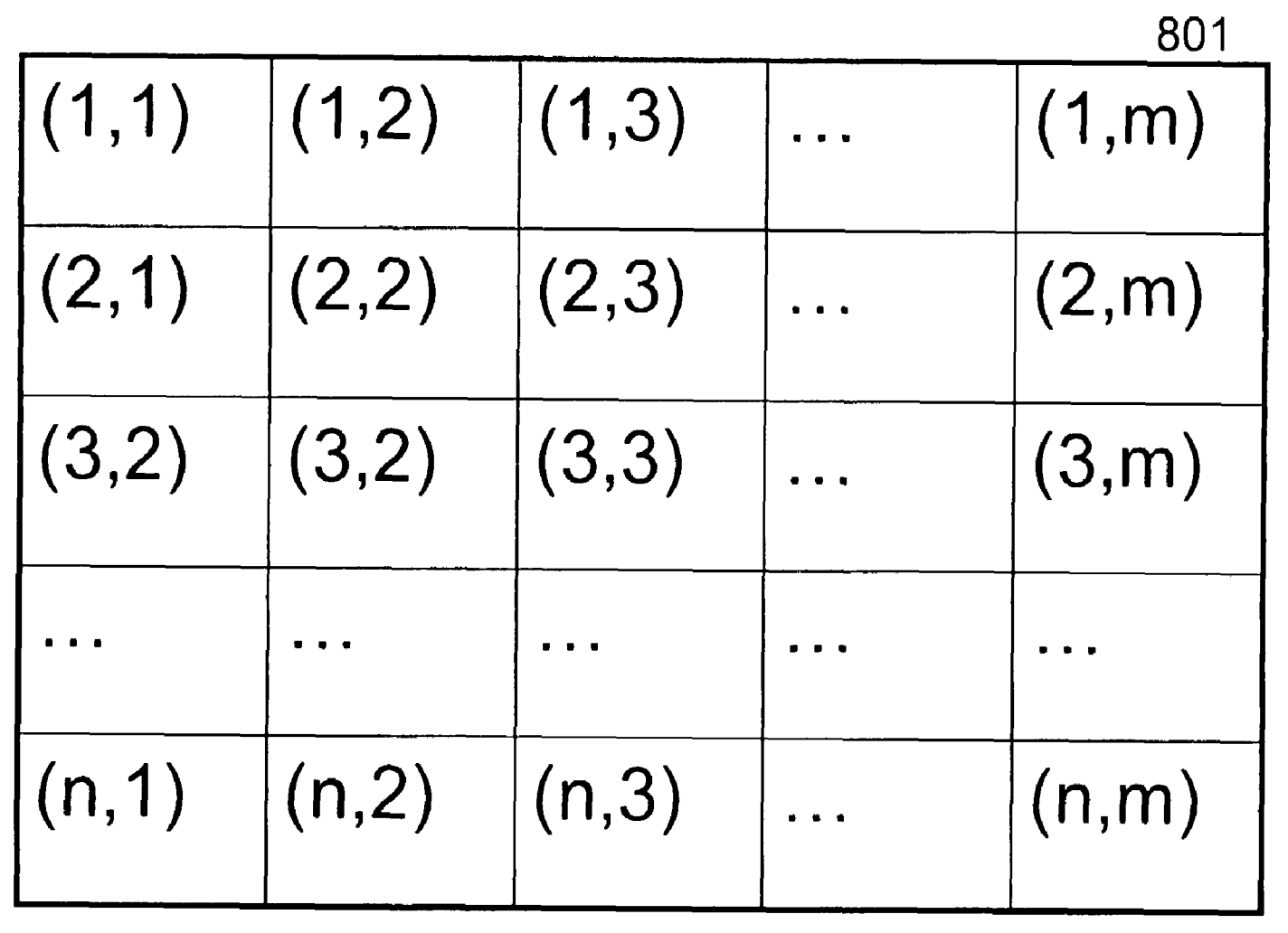

FIG. 8 illustrates the coordinate topology of focal plane array (FPA) sensors in which every pixel can be addressed by an ordered pair of whole-integers. Such an address also corresponds to the physical location of a given photodetector pixel of the FPA. Every pixel in the template image is tagged with a whole-integer coordinate consistent with the address coordinate of the corresponding focal plane array detector, as shown in FIG. 8. Pixels in every other frame are tagged with an adjusted coordinate based on the displacement estimate of their frame. From these tagged coordinates, a high resolution composite image can be assembled from individual pixels across different low resolution frames of constituent video. Extensions to this embodiment can include more complicated motion models relating coordinates between frames of video, such as affine, bilinear, or polynomial model distortions to accommodate perspective changes or geometric lens distortions. Additionally, any estimators used to determine the motion displacement between frames of video are themselves statistical operations with intrinsic uncertainty. Further extensions to this embodiment can include some additional estimate of the statistical uncertainty, such as a confidence interval, associated with each estimated coordinate for every pixel.

Figure 9:
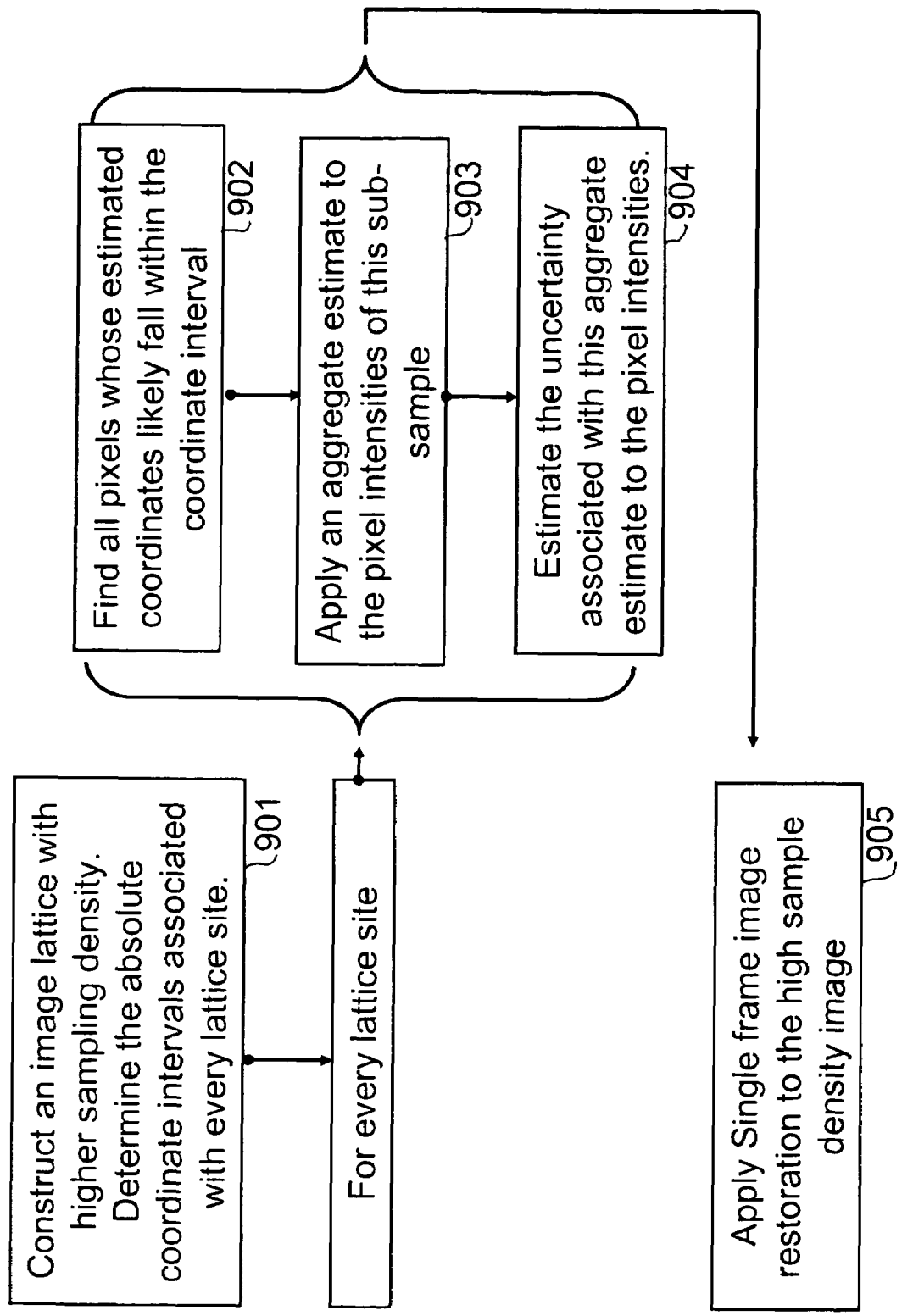
FIG. 9 illustrates a flow chart detailing the process by which a pixel in a high resolution composite image is estimated from pixels of original video.

After motion estimation has been applied to a video sequence, every pixel of the video sequence will have associated 5 quantities relevant to subsequent image restoration of the ROI of the template frame, namely:

1) Pixel intensity
2) X-coordinate location
3) Y-coordinate location
4) X-coordinate estimate uncertainty
5) Y-coordinate estimate uncertainty Step 2: Assembly of video Frames into a Single Composite Image Based on Estimated Positions of Individual Pixels Motion estimation, applied to a video sequence, generates a 5-entity database for every pixel element consisting of:

1) Pixel intensity
2) X-coordinate location
3) Y-coordinate location
4) X-coordinate location uncertainty
5) Y-coordinate location uncertainty This database of information is then re-assembled into a single composite image according to the following process, as illustrated in FIG. 9.

1) Define and construct a lattice with a higher sampling density than the template image used for motion estimation, 901. This lattice array does not necessarily have to be a whole number multiple of the template image pixel array size. In certain applications, it may be desirable to make the lattice size the same as the template image size.
2) Compute for each lattice site an associated coordinate interval, 902, corresponding to the rectangular span of each lattice site relative to the template image coordinate grid, 801. Such coordinate intervals of the lattice image may well span a sub-pixel sized area of the template image coordinates.
3) Find and select all pixels whose coordinates fall within the rectangular span of each lattice site, 903.
   a. In refined implementations of this method that include confidence intervals associated with each pixel's estimated coordinate, one would instead seek all pixels in the database whose estimated coordinates most likely fall within the rectangular span of each lattice site.
4) Given the sample of pixels intensities selected through step 2, construct an aggregate estimator for the estimated pixel intensity of each lattice site, 903. Such an aggregate estimator that can include, but is not limited to, the sample mean, sample median, or any other statistical estimator.
   a. In refined implementation, additional techniques including, but not limited to, statistical bootstrapping can be applied to provide an estimate of the statistical variability associated with estimated intensity of each lattice site, 904.
   b. In refined implementation, additional techniques may adopt kernelling methods estimate intensity using both the data binned in a particular lattice site, as well as the data binned in some region of neighboring lattice sites.

There can be considerable variability in the computational time needed to sort video pixels, 1001, into their appropriate lattice site, 1002, depending on the implementation of a sorting procedure and computational hardware. A "divide-and-conquer" approach, where the collection of pixels is separated into disjoint collections based on coarse pixel location, will speed up computational time by reducing the number of database elements each lattice site must finally sort through. The particular level of decimation, as well as any recursive implementation of this approach, will depend on the number of available processors, thread messaging speeds, and memory bus access times of the computational hardware upon which this process is implemented.

Step 3: Restoration of the Composite Image

Once a composite image has been reconstructed in step 2 from the motion estimate information computed in step 1, one can apply any of a myriad of single-frame image restoration techniques, 905, such as Wiener Filtering (*Fundamentals of Digital Image Processing*, A. K. Jain, Prentice Hall 1989), Lucy-Richardson blind-deconvolution (1972, J. Opt. Soc. Am., 62,55), Pixon-based deconvolution (1996, Astronomy and Astrophysics, 17,5), or other techniques. In refined implementations of this technique, the estimated uncertainty associated with each pixel's intensity of the reconstructed lattice can be leveraged by many single-frame image restoration algorithms to further enhance acuity performance of the restoration.

Figure 10:
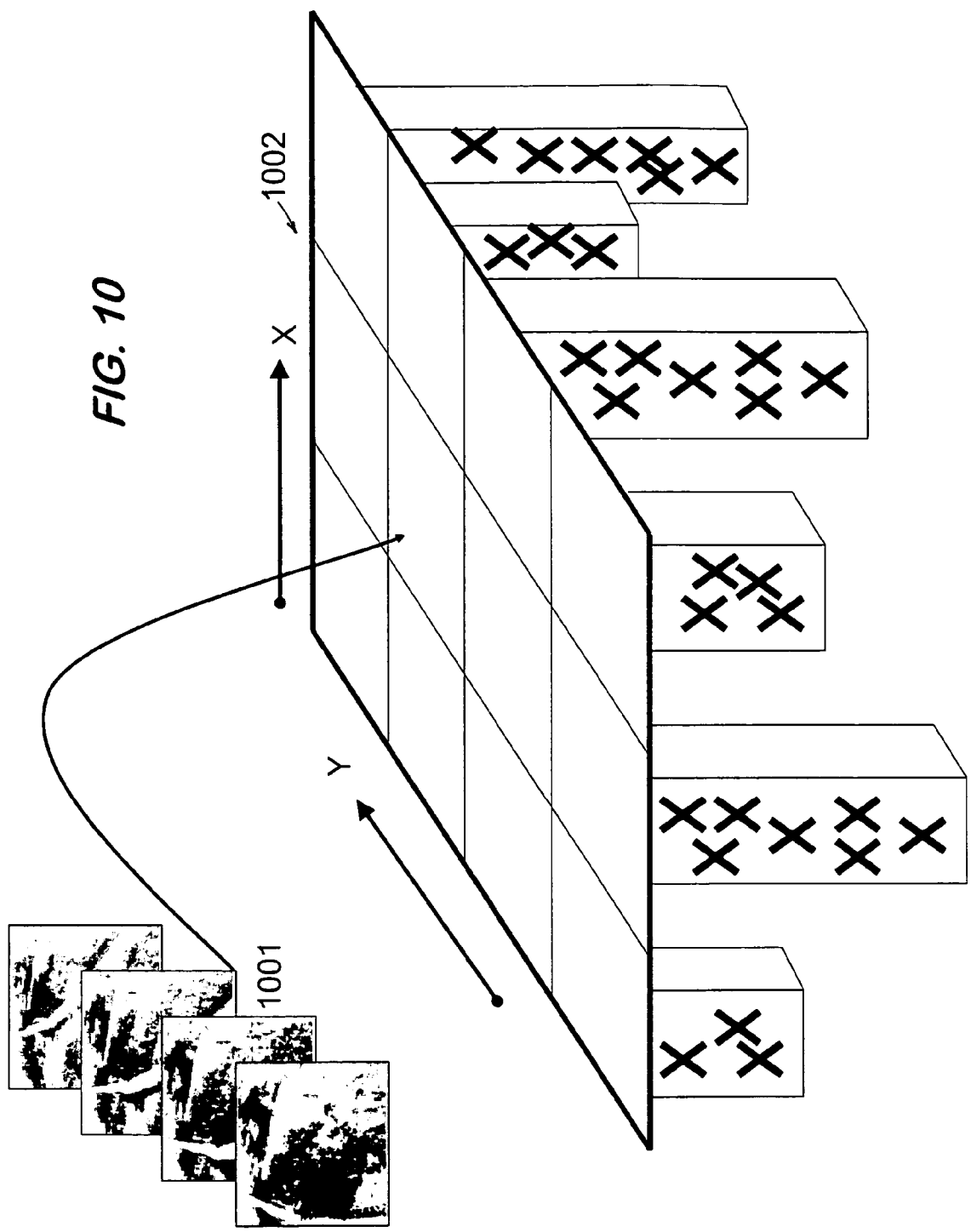
FIG. 10 illustrates the high-resolution lattice data structure associated with the re-sorted image data.

FIG. 10 illustrates the high-resolution lattice data structure associated with the re-sorted image data. Of note is that every lattice site can be variably populated by a differing number of pixels from the video sequence whose estimated coordinates lie within the coordinate span of the high-resolution lattice site.

The performance of any single-frame image restoration technique will invariably improve when applied instead to the composite image derived from multiple frames of video, in so far that the composite image will exhibit:

1) Reduced, or completely eliminated alias distortion resulting from under-sampling of the projected optical image by the FPA detector in the imaging sensor. Such alias distortion would otherwise limit the performance of single frame restoration algorithms applied to only a single frame from a video sequence.

2) Reduced noise associated with the use of aggregate statistical estimators to determine every pixel's intensity in the composite image based on the sub-sample of video pixels estimated to fall within the coordinates of a composite pixel's spatial location. The performance of single-frame image restoration algorithms improves as the constituent noise of the un-restored image is reduced.

3) Empirical estimates of the noise associated with every composite image pixel's estimated intensity, derived from the sub-sample of video pixels estimated to fall within the coordinates of a composite pixel's spatial location. Many single-frame restoration algorithms make an assumption of the underlying noise properties of the un-restored image. Empirical measurements of this underlying noise will improve the accuracy of the underlying assumptions, and consequently improve the performance of the single-frame image restoration step.

Although this invention has been described in relation to an exemplary embodiment thereof, it will be understood by those skilled in the art that still other variations and modifications can be effected in the preferred embodiment without detracting from the scope and spirit of the invention as described in the claims.

We claim:

1. A method of enhancing images from an electro-optic imaging system, comprising:
   estimating motion associated with a sequence of images collected from an object source;
   assembling said sequence of images to form a single composite image based on estimated positions of individual pixels; and
   restoring the composite image,
   wherein said assembling video frames into a single composite image based on estimated positions of individual pixels of the sequence of images includes
   defining and constructing a lattice array with a higher sampling density than a template image,
   computing for each lattice site an associated coordinate interval corresponding to a rectangular span of each lattice site relative to said template image coordinate grid,
   finding and selecting all pixels whose estimated coordinates and uncertainty intervals are statistically likely to belong within the rectangular span of each lattice site,
   processing intensity values associated with selected pixels by an aggregate estimator to produce a single intensity estimate for each lattice site thus forming a composite image, and
   determining an uncertainty of said lattice intensity estimates to produce an adjunct lattice of statistical variances of intensities of the composite image.

2. The method of claim 1 wherein said estimating motion associated with said sequence of images includes selecting a single image frame from said video sequence as a template from which the motion of all other frames of video is estimated.

3. The method of claim 2, where said estimating motion associated with said sequence assumes a displacement, and includes:
   estimating nearest pixel displacement by image correlation;
   estimating subpixel displacement by a least squares solution of brightness constancy constraint equation applied to aligned images;
   tagging every pixel in said template with a whole integer coordinate; and
   tagging every pixel in other frames with an adjusted coordinate based on the displacement estimate of said other frames.

4. The method of claim 1 wherein said restoring a composite image comprises an image restoration algorithm, said algorithm leveraging the adjunct matrix of statistical variances of intensities of the composite image to reduce effects of known blurs in pixels and optics.

5. A system for enhancing images captured by an electro-optic imaging sensor and for reducing focal length of said sensor while preserving system acuity, comprising:
   a computer executing software for estimating motion associated with a sequence of images from a sensor,
   wherein said estimating motion associated with said sequence includes associating with each pixel of the sequence of images a pixel intensity, an X-coordinate location, a Y-coordinate location, an X-coordinate estimate uncertainty, and a Y-coordinate estimate uncertainty;
   said computer executing software for assembling said sequence of images to form a single composite image based on intensity information, estimated positions of pixels in the sequence, and estimated uncertainties of the estimated positions; and
   said computer executing software for restoring the composite image,
   wherein said restoring a composite image includes generating a noise estimate associated with every composite image pixel's estimated intensity based on a sub-sample of video pixels estimated to fall within the coordinates span of a composite image pixel's location, and said noise estimates being used in said restoring of the composite image.

6. A system for enhancing images captured by an electro-optic imaging sensor and for reducing focal length of said sensor while preserving system acuity, comprising:

a computer executing software for estimating motion associated with a sequence of images from a sensor, wherein said estimating motion associated with said sequence includes associating with each pixel of the sequence of images a pixel intensity, an X-coordinate location, a Y-coordinate location, an X-coordinate estimate uncertainty, and a Y-coordinate estimate uncertainty;

said computer executing software for assembling said sequence of images to form a single composite image based on intensity information, estimated positions of pixels in the sequence, and estimated uncertainties of the estimated positions; and said computer executing software for restoring the composite image, wherein the sensor has a focal plane array, and the spatial sampling of the composite lattice exceeds that of the focal plane array, permitting the use of a lens with reduced focal length than otherwise needed to eliminate alias distortion of a single frame of video.

7. A method for enhancing images captured by an electro-optic imaging sensor and for reducing focal length of said sensor while preserving system acuity, the method comprising:

estimating motion associated with a sequence of images from the sensor, said estimating motion includes associating with each pixel of the sequence of images a pixel intensity, an X-coordinate location, a Y-coordinate location, an X-coordinate estimate uncertainty, and a Y-coordinate estimate uncertainty;

assembling said sequence of images to form a single composite image based on intensity information, estimated positions of pixels in the sequence, and estimated uncertainties of the estimated positions; and restoring the composite image, wherein said restoring includes generating a noise estimate associated with every composite image pixel's estimated intensity based on a subsample of video pixels estimated to fall within the coordinates span of a composite image pixel's location, and said noise estimates being used in said restoring of the composite image.

8. A method for enhancing images captured by an electro-optic imaging sensor having a focal plane array and for reducing focal length of the sensor while preserving system acuity, the method comprising:

estimating motion associated with a sequence of images from a sensor, said estimating motion including associating with each pixel of the sequence of images a pixel intensity, an X-coordinate location, a Y-coordinate location, an X-coordinate estimate uncertainty, and a Y-coordinate estimate uncertainty;

assembling said sequence of images to form a single composite image based on intensity information, estimated positions of pixels in the sequence, and estimated uncertainties of the estimated positions; and restoring the composite image, wherein the spatial sampling of the composite lattice exceeds that of the focal plane array, permitting the use of a lens with reduced focal length than otherwise needed to eliminate alias distortion of a single frame of video.

* * * * *